Jan. 13, 1959  J. S. CLARKE ET AL  2,867,982
COMBUSTION CHAMBERS FOR JET-PROPULSION
ENGINES, GAS TURBINES OR THE LIKE
Filed Nov. 18, 1954

Inventors
J. S. Clarke
E. S. Collinson

United States Patent Office 2,867,982
Patented Jan. 13, 1959

2,867,982

COMBUSTION CHAMBERS FOR JET-PROPULSION ENGINES, GAS TURBINES OR THE LIKE

John Stanley Clarke, Blacko, near Nelson, England, and Eric Samuel Collinson, Wexford, Ontario, Canada, assignors to Joseph Lucas (Industries) Limited, Birmingham, England Application November 18, 1954, Serial No. 469,686

1 Claim. (Cl. 60—39.69)

This invention relates to combustion chambers of the annular type for jet-propulsion engines, gas turbines or the like.

The object of the invention is to provide a construction which ensures intimate admixture with the fuel admitted to the entrance end of the combustion chamber through a plurality of burner nozzles, of air admitted adjacent to the nozzles.

The invention comprises the combination with the entrance end of the combustion chamber, of an annular baffle, or an annular assembly of separate baffles, carrying the burner nozzles, and swirl plates mounted on the approach side of the baffle or baffles, the swirl plates being adapted to set up a swirling motion in the air streams admitted between the nozzles.

Figure 1:
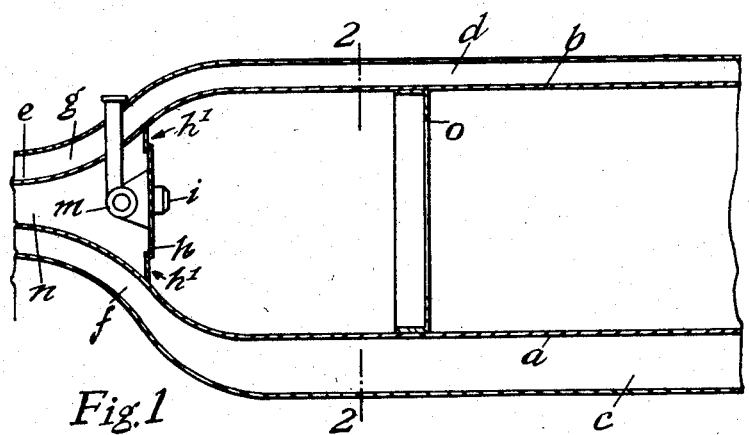

In the accompanying drawings, Figure 1 is a longitudinal section illustrating a portion of an annular combustion chamber embodying the invention.

Figure 2:
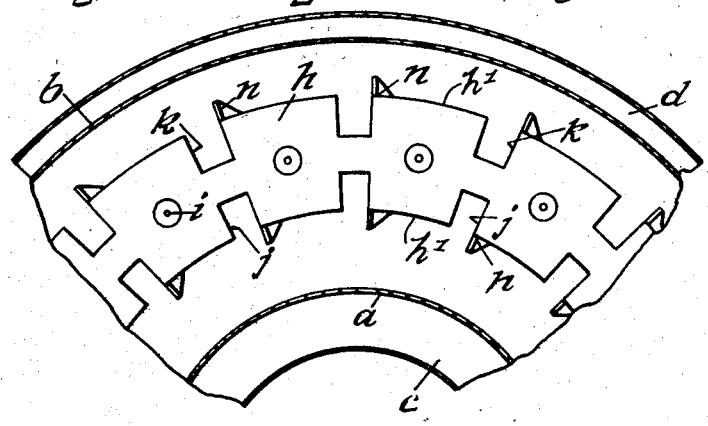
Figure 3:
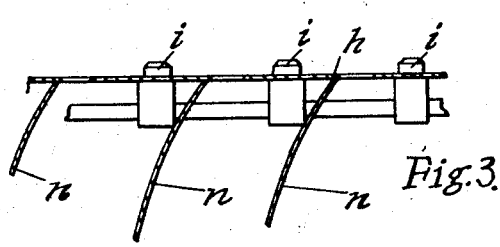

Figure 2 is a sectional end view on the line 2.2 (Figure 1), and Figure 3 is a developed fragmentary plan view.

Referring to the drawings, the inner and outer walls $a$, $b$ of the combustion chamber are constructed from metal sheets, and each wall is surrounded by an air jacket $c$, $d$. The entrance end of the combustion chamber is shaped to a gradually diminishing form and has a relatively narrow annular air inlet $e$. The adjacent wall parts of the air jackets are correspondingly shaped so as to form a pair of annular passages $f$, $g$ leading from a common annular air inlet to the two jackets. Air supplied by a blower is divided into three streams, two of which supply the jackets, and the other supplies the entrance end of the combustion chamber.

In the entrance end of the combustion chamber is mounted an annular sheet metal baffle $h$ on which are mounted a plurality of equi-spaced burner nozzles $i$. All the nozzles may be principal nozzles or the alternate ones may be principal nozzles, the others serving as pilot nozzles.

The baffle is adapted to divert the incoming air towards the inner and outer walls of the combustion chamber, and it may consist of a continuous plate having notches $j$, $k$ in its inner and outer peripheries between the nozzles, or it may be constructed from a plurality of separate plates having gaps between their adjacent edges. In either case the inner and outer peripheries of the annular baffle plate or plate assembly are separated from the internal surfaces of the combustion chamber by spaces $h^1$.

Fuel is supplied to the nozzles by an annular feed pipe $m$ or pipes carried on the approach side of the baffle.

Air is admitted to the entrance end of the combustion chamber in part past the peripheral edges of the baffle, and in part through the said notches or gaps. To produce a swirling motion of the air passing through the notches or gaps, there is attached to or formed on the approach side of the baffle and adjacent to one edge of each notch or gap, an inclined or curved guide plate $n$ as shown in Figure 3, this being so shaped and disposed as to impart the desired motion to the air flowing over it.

If desired an annular baffle $o$ may be arranged in the combustion chamber at the end of the combustion zone remote from the nozzles.

By this invention uniform combustion of the fuel is obtained at each of the nozzles.

Having thus described our invention what we claim as new and desire to secure by Letters Patent is:

An annular combustion chamber for a prime mover, having at one end an annular entrance through which air under pressure can flow into said chamber, and having in combination baffle means situated around the interior of said chamber in a transverse plane adjacent said entrance, and separated from the internal peripheral surfaces of said chamber by spaces through which air admitted to said entrance can flow, burner nozzles carried by said baffle means in spaced relationship around the interior of said chamber, said baffle means having openings through which air from said entrance can flow between said nozzles, and swirl plates having edges contiguous with edges of the said openings and mounted on the approach side of said baffle means for setting up a swirling motion in the air passing through said openings.

References Cited in the file of this patent

UNITED STATES PATENTS

| | | |
|---|---|---|
| 2,603,064 | Williams | July 15, 1952 |
| 2,669,839 | Saboe | Feb. 23, 1954 |
| 2,679,137 | Probert | May 25, 1954 |